(12) United States Patent
Delaney

(10) Patent No.: US 9,078,545 B2
(45) Date of Patent: Jul. 14, 2015

(54) DISPOSABLE WASTE COLLECTION SYSTEM FOR A PORTABLE COMMODE

(71) Applicant: Molly Bridget Delaney, Eden Prairie, MN (US)

(72) Inventor: Molly Bridget Delaney, Eden Prairie, MN (US)

(*) Notice: Subject to any disclaimer, the term of this patent is extended or adjusted under 35 U.S.C. 154(b) by 212 days.

(21) Appl. No.: 13/908,746

(22) Filed: Jun. 3, 2013

(65) Prior Publication Data

US 2013/0318702 A1   Dec. 5, 2013

Related U.S. Application Data

(60) Provisional application No. 61/655,555, filed on Jun. 5, 2012.

(51) Int. Cl.
| A47K 11/02 | (2006.01) |
|---|---|
| A61G 9/00 | (2006.01) |
| A61G 5/10 | (2006.01) |
| A61G 7/02 | (2006.01) |

(52) U.S. Cl.
CPC .............. *A47K 11/02* (2013.01); *A61G 9/003* (2013.01); *A61G 9/006* (2013.01); *A61G 5/1002* (2013.01); *A61G 7/02* (2013.01)

(58) Field of Classification Search
CPC ....... A47K 11/00; A47K 11/02; A61G 9/003; A61G 9/006; A61G 5/1002; A61G 7/02
USPC ...................... 4/483, 479, 480, 484
See application file for complete search history.

(56) References Cited

U.S. PATENT DOCUMENTS

| 472,826 | A | * | 4/1892 | Rudrof | ............................ | 4/483 |
|---|---|---|---|---|---|---|
| 4,550,455 | A | * | 11/1985 | Carson et al. | .................... | 4/480 |
| 5,163,188 | A | * | 11/1992 | Munroe | ..................... | 5/81.1 R |
| 5,685,029 | A | * | 11/1997 | Gee | ................................ | 4/483 |
| 2010/0175178 | A1 | * | 7/2010 | Mrugala | .......................... | 4/483 |
| 2011/0185490 | A1 | * | 8/2011 | Bonamy | .......................... | 4/452 |

* cited by examiner

*Primary Examiner* — J. Casimer Jacyna

(57) ABSTRACT

An independent disposable commode pail used with a modular commode that includes a seat and attachable legs. The seat has attachment points for the legs, as well as angled edges. The attachable legs magnetically secure to the attachment points on the seat. The seat has a seat opening in its center. The angled edges of the seat secure to a frame edge, like on a gurney. The combination of attached legs and a supporting frame edge are enough to stabilize the modular commode and support a user. The receptacle is placed into the seat opening, with a rim of the receptacle being supported by the surface of the seat. A user is able to place their buttocks over the seat opening and defecate or urinate into the receptacle. The receptacle can then easily be removed, inspected, locked and disposed, minimizing cleanup. The modular commode is then easily disassembled and stored.

32 Claims, 6 Drawing Sheets

DISPOSABLE WASTE COLLECTION SYSTEM FOR A PORTABLE COMMODE

The current application claims a priority to the U.S. Provisional Patent application Ser. No. 61/655,555 filed on Jun. 5, 2012.

FIELD OF THE INVENTION

The present invention relates generally to an apparatus for a commode and an accompanying disposable commode pail. More specifically, the present invention is a commode that slides into any bed frame and is used in tandem with an independent disposable commode bag. The present invention has removable legs, all of which may be attached to the commode.

BACKGROUND OF THE INVENTION

Many patients that are in hospitals are connected to IVs, cardiac monitors, or other apparatuses from which they cannot be disconnected. Since the movement of such patients is limited and prevention of falls is a safety concern, so are their opportunities for expelling waste. Such patients are often resigned to using bedpans, while others may simply not have any facilities provided. While bedpans are certainly a better option than being provided with nothing at all, they can be difficult for both the patient and attending health care worker. The patient may find the bedpan uncomfortable or demeaning, while the health care worker may have difficulty in positioning the bedpan for patient use. Spills lead to delays, increased time spent changing linens, laundering costs of linen & potential for bedsores. In addition, the bedpan requires cleaning; cleaning the bedpan increases the workload of health care professionals, and serves as a potential source of germs and splash injuries if cleaned hastily or insufficiently.

An alternative to bedpans is the portable commode. These are much more pleasant for patients, coming closer to replicating a standard bathroom experience. However, portable commodes are often bulky and difficult to set up, requiring ample space, time, or both to be prepared for use. While some commodes are no more difficult to clean than chamber pots, with a few even offering disposable receptacles, the larger size means that there are more surface to contaminate. The sometimes elaborate shapes of portable commodes may mean these surfaces are difficult to access and clean.

It is therefore an object of the present invention to provide an apparatus that allows a patient the ability to use the restroom facilities without having to move a considerable distance from their bed.

DETAIL DESCRIPTIONS OF THE INVENTION

Figure 1:
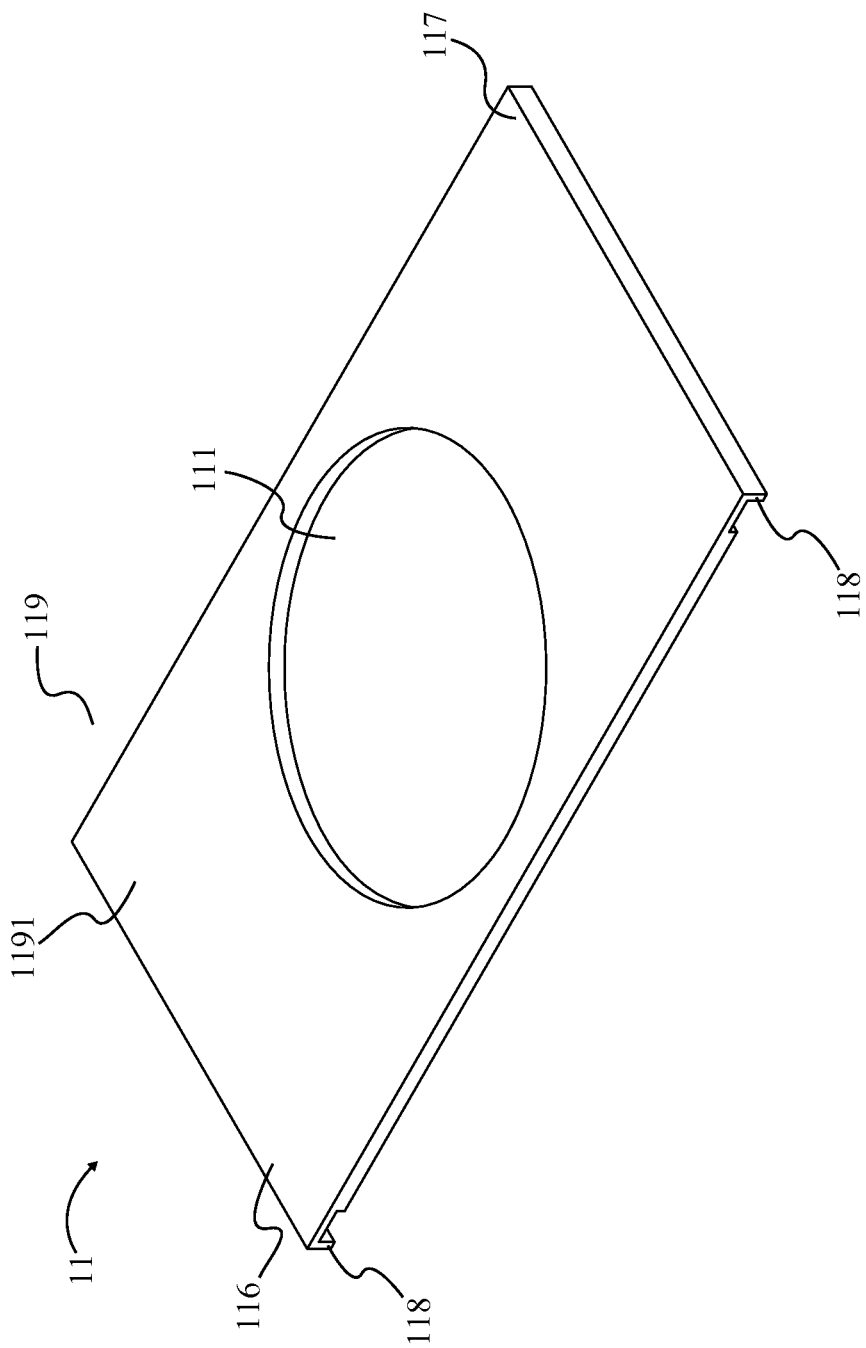
FIG. 1 is a perspective view of the seat of the present invention.

All illustrations of the drawings are for the purpose of describing selected versions of the present invention and are not intended to limit the scope of the present invention.

The present invention is for a modular commode 1 and disposable translucent receptacle 2, such as generally used in a hospital setting. The modular commode 1 comprises a seat 11, a first magnetized leg 12, a second magnetized leg 13, and a disposable translucent receptacle 2, which itself is rimmed. The first magnetized leg 12 and the second magnetized leg 13 attach to the underside of the seat 11, serving as supports. The translucent receptacle 2 attaches to the center of the seat 11, receiving waste materials and effectively allowing the present invention to serve its function as a commode.

Figure 2:
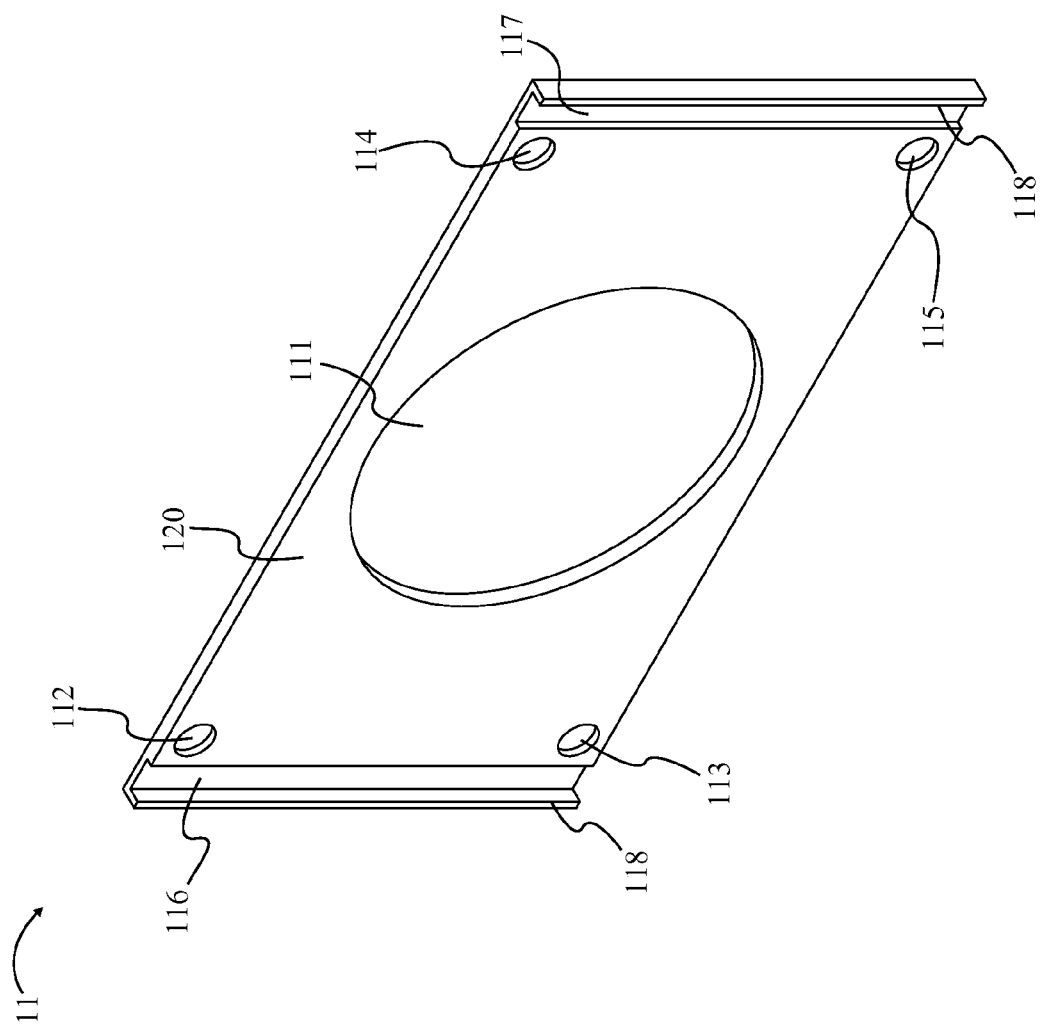
FIG. 2 is a bottom perspective view of the seat of the present invention.

The seat 11, illustrated in FIG. 1 and FIG. 2, comprises a seat opening 111, a first socket 112, a second socket 113, a third socket 114, a fourth socket 115, a first magnetized side bar 116, a second magnetized side bar 117, an illuminated sitting surface 119, and an underside 120. The seat opening 111 is positioned in the center of the seat 11, creating a space; through this space waste can be deposited into the translucent receptacle 2, which itself is attached to or sits on top of the seat 11. The seat opening 111 extends through a thickness dimension of the seat 11. The first magnetized side bar 116 and the second magnetized side bar 117 are connected to opposite edges of the seat 11, such that the surface of the seat 11 and the seat opening 111 are positioned between the first magnetized side bar 116 and the second magnetized side bar 117. The first magnetized side bar 116 and the second magnetized side bar 117 are thus separated by a width dimension of the seat 11. The first magnetized side bar 116 and the second magnetized side bar 117 each comprise a gripping support edge 118. The gripping support edge 118 is angled, allowing the gripping support edge 118 to secure the side rail or edge of a gurney or a bed, providing further support to the present invention. The sockets create cavities in the seat 11. These sockets are positioned at the edges of the seat 11 adjacent to the ends of the first magnetized side bar 116 and the second magnetized side bar 117. The illuminated sitting surface 119, which functions as a top surface of the seat 11, encloses the surface of the seat 11, making the present invention easily visible in low-light conditions. The illuminated sitting surface 119 acts as an upper sitting surface of the seat 11. The underside 120 of the seat serves as a bottom surface of the seat, positioned opposite the illuminated sitting surface 119. The sockets are positioned on the underside 120 of the seat 11.

In the preferred embodiment the seat 11 has a rectangular shape, resulting in the first magnetized side bar 116 and the second magnetized side bar 117 being parallel with each other. The seat 11 is made from a metallic material, allowing magnetic items to attach to the seat 11. The seat opening 111 is circular in shape. The first socket 112 is adjacent to a first end of the first magnetized side bar 116, while the second socket 113 is adjacent to a second end of the first magnetized side bar 116. Likewise, the third socket 114 and fourth socket 115 are adjacent to a first end and second end of the second magnetized side bar 117, respectively. The illuminated sitting surface 119 is made from a phosphorescent material 1191, i.e. glow-in-the-dark. The gripping support edge 118 is L-shaped (being perpendicular to the seat 11) and made from rubber, aiding users in grasping the seat 11 while simultaneously protecting against pinched fingers.

In other embodiments the seat 11 can have a different shape, as can the seat opening 111. For example, the seat 11 could be shaped like an octagon or a ring. Similarly the seat opening 111 could be hexagonal in shape, rather than circular. The size of the seat 11, expressed by a thickness dimension, a width dimension, and a height dimension, can also vary. The first magnetized side bar 116 and second magnetized side bar 117 would still connect to the seat 11, connecting to opposite ends of the seat 11 and being parallel with each other. While a variety of shapes and sizes can be used for the seat 11 and the seat opening 111, they should not interfere with the function of the present invention. The seat opening 111 should be small enough that a person's buttocks can be supported by the seat 11, but not so small that a person would be unable to defecate or urinate through the seat opening 111. The gripping support edge 118 can have a variety of shapes, such as a curved hook-like shape. The specific shape is not as important as the function of the gripping support edge 118, which is to support the seat 11 at one end by attaching to a surface edge, e.g. the frame of a gurney. The gripping support edge 118 may be made from or covered with materials other than rubber, as long as the material used enhances grip. The illuminated sitting surface 119 can be made from any material that provides a luminescent sitting surface, not being limited to phosphorescent materials 1191.

Figure 3:
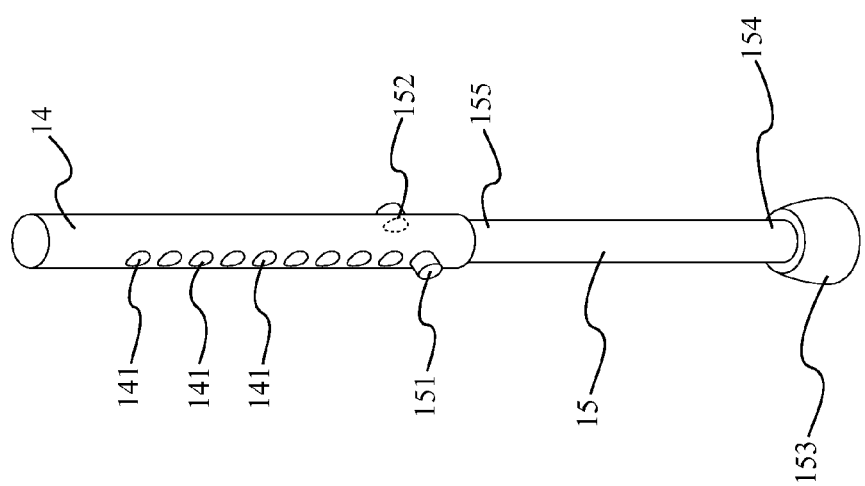
FIG. 3 is a perspective view of a leg of the present invention.

The first magnetized leg 12 and second magnetized leg 13 each comprise an upper tube 14 and a lower tube 15. The upper tube 14 comprises a set of guide holes 141, while the lower tube 15 comprises a locking mechanism 151, a lock hole 152, a gripping foot 153, a base end 154, and a top end 155, as seen in FIG. 3. The gripping foot 153 is positioned at the base end 154 of the lower tube 15, while the locking mechanism 151 and lock hole 152 are positioned at the top end 155 of the lower tube 15. The locking mechanism 151 is housed within the lower tube 15. The set of guide holes 141 is linearly positioned along the upper tube 14, such that it has a longitudinal orientation. The lower tube 15 has a smaller radius than the upper tube 14, allowing the lower tube 15 to telescope into the upper tube 14. The telescoping relation between the lower tube 15 and the upper tube 14 allows a user to easily adjust the height of the first magnetized leg 12 and the second magnetized leg 13. The base end 154 effectively serves as a bottom end of the lower tube 15.

In the preferred embodiment the legs are cylindrical in shape. The guide holes 141 in the set of guide holes 141 are cylindrical as well. As with the gripping support edge 118, the gripping foot 153 is made from rubber. The rubber construction of the gripping foot 153 helps to prevent the legs from slipping, aiding in stabilization of the present invention. The locking mechanism 151 is a detent utilizing a spring-loaded rod. When the lock hole 152 is aligned with one of the set of guide holes 141, the spring-loaded rod extends through both holes and prevents the lower tube 15 from moving, either into or out of the upper tube 14. Thus, by engaging the detent with a selected one of the guide holes 141 the height of the modular commode 1 can bad adjusted.

In other embodiments various shapes can be used for the first magnetized leg 12, the second magnetized leg 13, and the individual holes from the set of guide holes 141. The shape used for the legs should be capable of supporting the present invention, especially when a person is sitting on the seat 11. While various designs can be successfully employed, other designs will provide insufficient support or prevent the lower tube 15 from telescoping into the upper tube 14. As with the gripping support edge 118, the gripping foot 153 can be made of materials other than rubber, as long as said materials have non-slip properties. In addition to a variety of shapes, the first magnetized leg 12 and second magnetized leg 13 may utilize different locking mechanisms 151. For example, instead of using a spring-loaded rod the locking mechanism 151 could simply be a quick release clamp, similar to those that allow height adjustment of bicycle seat 11s. The use of a quick release clamp would negate the need for guide holes 141 and a lock hole 152, while still allowing the height of the first magnetized leg 12 and second magnetized leg 13 to be easily adjusted.

Figure 4:
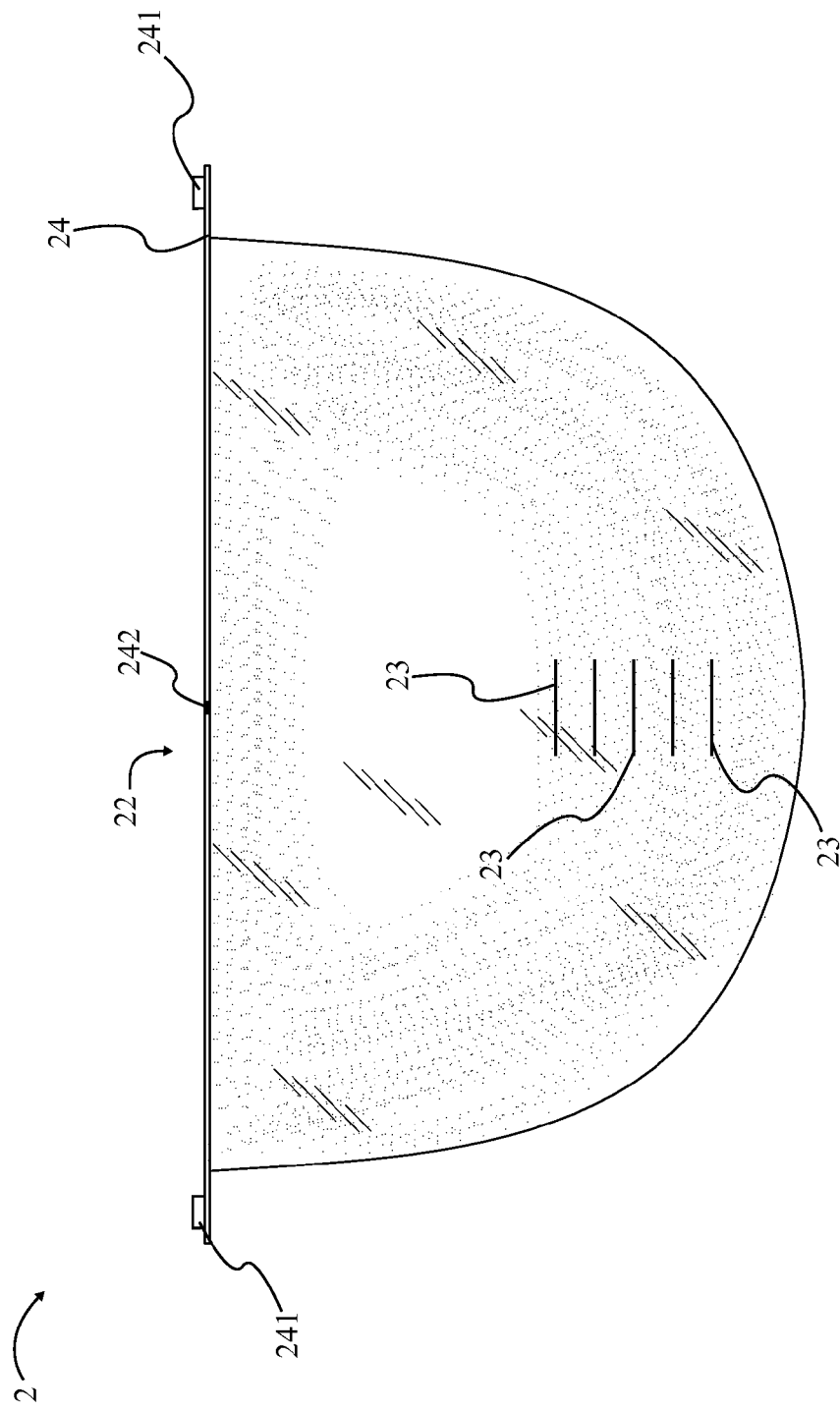
FIG. 4 is a front view of the receptacle of the present invention.
Figure 5:
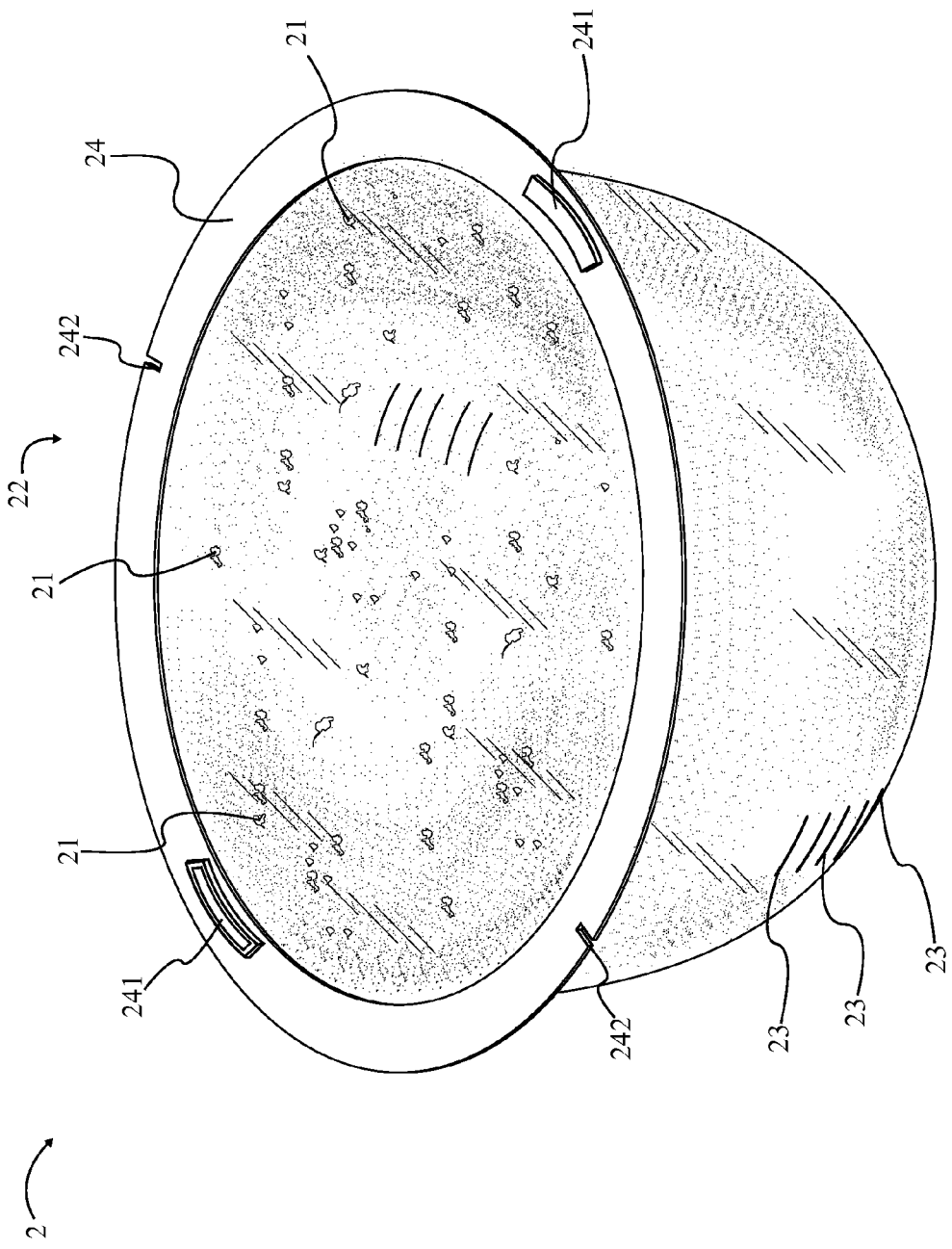
FIG. 5 is a perspective view of the receptacle of the present invention.

Depicted in FIG. 4 and FIG. 5, the translucent receptacle 2 comprises a receptacle opening 22, a plurality of measurement markings 23, and a rigid rim 24. The rigid rim 24 serves as the perimeter of the receptacle opening 22. The rigid rim 24 is aligned with the edge of the seat opening 111, such that the seat opening 111 leads directly into the receptacle opening 22. The plurality of measurement markings 23 are positioned on the translucent receptacle 2 and allow a user to estimate the volume of contents held by the translucent receptacle 2. The rigid rim 24 comprises a plurality of notches 242, positioned consecutively along the perimeter of the rigid rim 24. In other embodiments, the rigid rim 24 includes a closing mechanism 241 in addition to the plurality of notches 242. The closing mechanism 241 is used to close the opening formed by the rigid rim 24. This can be accomplished in various ways. One example is providing hinges on opposite sides of the rigid rim 24, which allow the rigid rim 24 to be switched from an open position to a closed position. Once in the closed position, a set of interlocking clasps are engaged with each other to lock the rigid rim 24 in the closed position. These interlocking clasps are positioned around the rigid rim 24, with pairs of interlocking clasps being diametrically opposed from each other. Alternatively, the locking mechanism 151 could be a basic strap adjuster, like those found on the common baseball cap. These are just a few examples of potential locking mechanisms 151; a variety of closing mechanisms 241 can be implemented with the present invention.

In the preferred embodiment the translucent receptacle 2 is made from a plastic or other biodegradable material. The rigid rim 24 is circular in shape, matching the shape of the seat opening 111. The rigid rim 24 is slightly wider than the seat opening 111, allowing the translucent receptacle 2 to simply be placed on the seat 11 and be held in place by gravity.

In other embodiments different materials can be used for the translucent receptacle 2. In addition to being translucent, materials used should be solid and flexible; the translucent receptacle 2 should be capable of holding waste contents, but also needs to be flexible enough in case it is to be sealed with interlocking clasps.

The present invention is designed to be easily assembled and disassembled, with the seat 11, first magnetized leg 12, second magnetized leg 13, and translucent receptacle 2 being separable from the other parts. In the disassembled state the present invention can easily be stored in a small space, ideal for hospital environments. The magnetic properties of the present invention mean that the components can be secured underneath a gurney, with the first magnetized leg 12, second magnetized leg 13, and seat 11 being magnetically attached to the gurney. This allows a health care worker fast and easy access to the present invention, simply sliding the seat 11 out from underneath the gurney. Alternatively, the present invention could be stored between a mattress and box spring, if used in a non hospital environment with regular beds. In addition to being easily accessed, the present invention is also easy to assemble.

To assemble and use the present invention the seat 11, first magnetized leg 12, and second magnetized leg 13 are retrieved from storage (e.g. the bottom surface of a gurney in the preferred embodiment). The first magnetized leg 12 and second magnetized leg 13 are then attached to the seat 11, by inserting the upper tube 14 of the first magnetized leg 12 into the first socket 112 and inserting the upper tube 14 of the second magnetized leg 13 into the second socket 113. The first magnetized leg 12 and second magnetized leg 13 may be secured by a variety of methods. In the preferred embodiment, magnetic attraction secures the first magnetized leg 12 and second magnetized leg 13 to the seat 11. Other embodiments may utilize different solutions. For a simple and inexpensive solution, a friction fit could be used to secure the first magnetized leg 12 and second magnetized leg 13 to the seat 11. Alternatively, the first magnetized leg 12 and second magnetized could be screwed into the seat 11. Other possibilities include using hook-and-loop fasteners or snap button fasteners.

Once the first magnetized leg 12 and second magnetized leg 13 are attached to the seat 11, the seat 11 can be attached to the edge of a gurney. This is done by placing the second magnetized side bar 117 over an edge bar of the gurney, such that the gripping support edge 118 rests on the edge bar of the gurney. In this manner the seat 11 will be supported at one edge (the first magnetized side bar 116) by the first magnetized leg 12 and the second magnetized leg 13. The seat 11 will be supported at the opposite edge (the second magnetized side bar 117) by the edge bar of the gurney. Since the gurney edge is metallic, the magnetic nature of the second magnetized side bar 117 will help to further secure the seat 11 to the gurney edge.

After securing the seat 11 to the gurney, the height of the first magnetized side bar 116 and the second magnetized side bar 117 can be adjusted, if necessary. This is done by disengaging the locking mechanism 151, then moving the lower tube 15 further into or out of the upper tube 14, as necessary. Once the first magnetized leg 12 and second magnetized leg 13 are at the desired height, the locking mechanism 151 can be re-engaged. With the first magnetized leg 12 and second magnetized leg 13 at the appropriate height, the seat 11 will be sturdy enough to support a patient.

Figure 6:
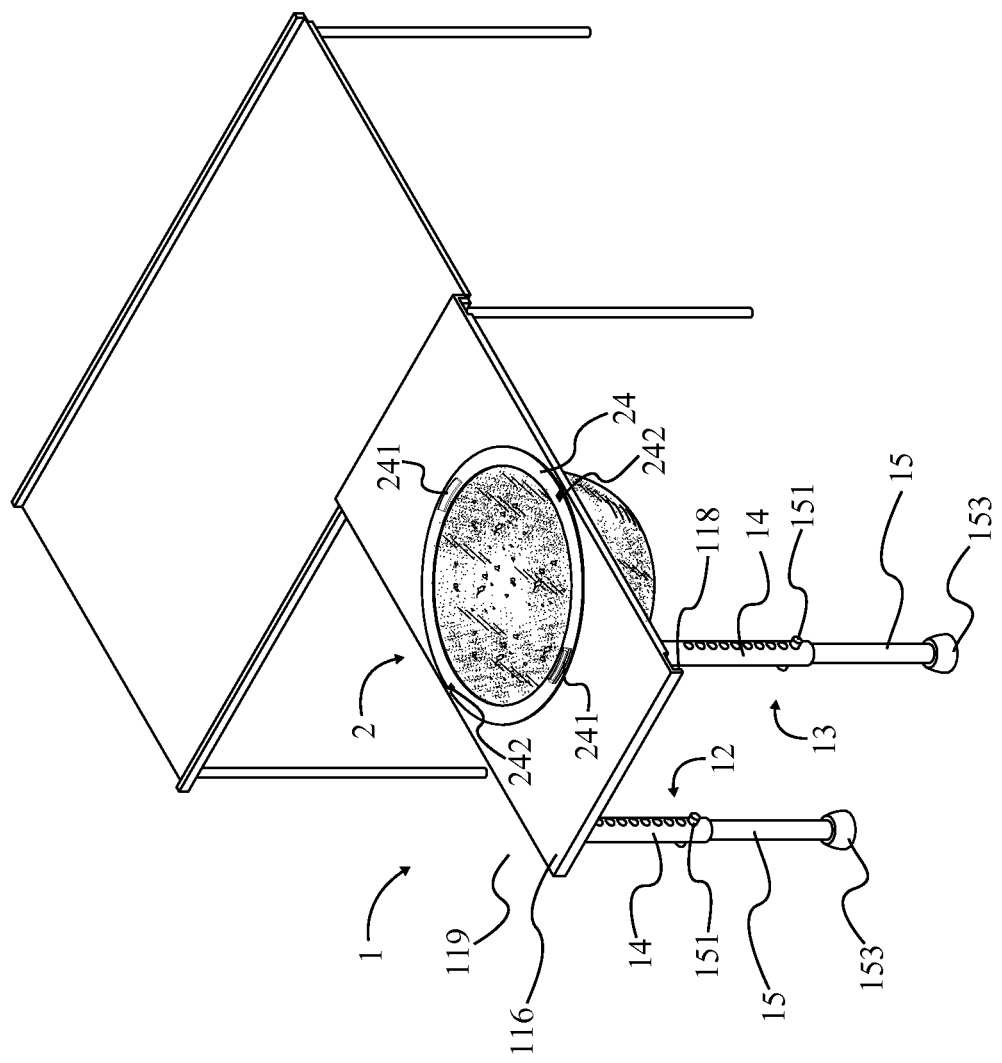
FIG. 6 is a perspective view of the present invention attached to a frame edge.

Following securing the seat 11 to the gurney the translucent receptacle 2 can be attached to the seat 11. This attachment is shown in FIG. 6. The translucent receptacle 2 is taken from a dispenser and placed over the seat opening 111. The rigid rim 24 of the translucent receptacle 2 will rest upon the seat 11, such that the translucent receptacle 2 will hang through the seat opening 111. The translucent receptacle 2 combines with the seat 11 to provide an easily accessible commode for patients to deposit waste into, with the translucent receptacle 2 effectively acting as a large emesis bag. The plurality of measurement markings 23 allows a health care worker to quickly estimate fluids or solids expelled. For example, if a patient has blood in their urine, the measurement markings 23 would provide a way to quickly estimate how much blood was lost. After use, the notches 242 around the rigid rim 24 allow the translucent receptacle 2 to easily be closed and disposed of, by twisting the translucent receptacle 2 and flipping the rim such that the twisted portion of the translucent receptacle 2 is held by one of the plurality of notches 242.

In order to meet landfill use definitions and be landfill friendly, the disposable commode bag (the translucent receptacle 2) includes an absorbent material 21, e.g. crystals, commonly found in both adult and children's diapers; one such example of an absorbent material 21 is sodium polyacrylate, found in children's diapers. Effectively, any moisture impervious or liquid impervious material can be used for the translucent receptacle 2. Examples of the absorbent material are visible in FIG. 5 and FIG. 6.

While the method of assembly has described attaching the first magnetized leg 12 to the first socket 112 and the second magnetized leg 13 to the second socket 113, the first magnetized leg 12 could just as easily be attached to the third socket 114, with the second magnetized leg 13 attaching to the fourth socket 115. In this example the first magnetized side bar 116 would be secured to the gurney edge.

The disposable nature of the translucent receptacle 2 makes the present invention much more user friendly. With a traditional commode, the receiving pot would need to be emptied and cleaned. With the present invention, the amount of cleaning required is greatly reduced, courtesy of the disposable translucent receptacle 2. The present invention also quickly disassembles and can be stored on the bottom surface of a gurney, or between a mattress and box spring, requiring less space and time to use than a traditional commode.

Further variations of the present invention include attaching more than two legs to the seat 11. While attaching multiple legs will increase assembly and disassembly time, structural support would be increased. This may be necessary for overweight patients. Another method of increasing support is adding a support bar connecting the legs to each other. This would make the legs more unwieldy, but in some cases the additional support may be more important than the bulkiness of the present invention. The translucent receptacle 2 could also include a set of filters, such as one for separating solids from liquids, or even different types of liquids. This could help a health care worker more accurately estimate a patient's fluid output after defecating or urinating. To add usability a dispenser containing a supply of translucent receptacles 2 could be attached to the underside 120 of the seat 11 or on the wall in the patients room.

Although the invention has been explained in relation to its preferred embodiment, it is to be understood that many other possible modifications and variations can be made without departing from the spirit and scope of the invention as hereinafter claimed.

What is claimed is:

1. A disposable waste collection system for a portable commode comprising:
    a) a modular commode adapted to connect to one of a bed frame or a gurney, the modular commode having:
        i) a seat, said seat comprising an upper sitting surface, an underside, a seat opening creating a space, and a first side bar and a second side bar each having a gripping support edge angled to allow the gripping support edge to conform to a gurney or a bed frame, the first side bar and the second side bar being magnetized and positioned opposite each other across the seat; and
        ii) a first leg and second leg perpendicularly attached to the underside of the seat wherein the first leg and second leg provide underneath support to the seat;
    b) a disposable receptacle, made of a moisture impervious material, said disposable receptacle having:
        i) a receptacle opening;
        ii) a plurality of measurement markings; and
        iii) a rigid rim for surrounding the seat opening and providing a perimeter to the receptacle opening and including a closing mechanism;
    c) the disposable receptacle adapted to attach to the seat for receiving human waste material via the space created by the seat opening and the closing mechanism adapted to close the receptacle opening.

2. The disposable waste collection system for a portable commode of claim 1, wherein the sitting surface is luminescent and is laterally positioned around the seat opening, wherein the sitting surface forms a top surface of the seat.

3. The disposable waste collection system for a portable commode of claim 1, wherein the seat opening extends through the seat between the first side bar and the second side bar.

4. The disposable waste collection system for a portable commode of claim 1, wherein the seat further comprises a first socket and a second socket being positioned adjacent opposed ends of the first side bar on the underside and a third socket and a fourth socket being positioned adjacent opposed ends of the second side bar on the underside.

5. The disposable waste collection system for a portable commode as claimed in claim 1, wherein the first leg and the second leg each comprise:
   a) an upper tube of magnetic material; and
   b) a lower tube having a smaller radius than said upper tube allowing the lower tube to telescope into the upper tube, one of said upper and lower tubes having a set of guide holes longitudinally spaced thereon and the other of said upper and lower tubes including a detent for cooperating with one of the set of guide holes such that when the lower tube telescopes into the upper tube, and the detent is aligned with one of the set of guide holes thereby preventing the lower tube from moving with respect to the upper tube.

6. The disposable waste collection system for a portable commode of claim 5, wherein the lower tube further includes a gripping foot positioned on a bottom end of the lower tube.

7. The disposable waste collection system of claim 5, wherein the detent comprises a spring loaded rod housed within the lower tube adjacent to a top end of the lower tube.

8. The disposable waste collection system for a portable commode of claims 5, wherein the upper tube of the first leg is adapted to fit into a first socket of the underside and the upper tube of the second leg is adapted to fit into a second socket of the seat underside.

9. A disposable waste collection system for a portable commode comprising:
   a. a modular commode adapted to attach to a bed frame or a gurney, the modular commode having:
      i) a seat, said seat comprising a luminescent sitting surface, wherein the luminescent sitting surface is made from a phosphorescent material, and an underside, a seat opening creating a space, and a first side bar and a second side bar each having a gripping support edge angled to allow the gripping support edge to conform to one of a bed frame or a gurney side rail; and
      ii) a first magnetized leg and a second magnetized leg perpendicularly attached to the underside of the seat, wherein the first magnetized leg and the second magnetized leg provide underneath support to the seat;
   b. a disposable receptacle made of a liquid impervious material having:
      i) a receptacle opening; and
      ii) a rigid rim, wherein the rigid rim includes a closing mechanism;
   c) the disposable receptacle being coupled to the seat by the rigid rim, the disposable receptacle extending through the seat opening, the receptacle opening being surrounded by the rigid rim, there being a plurality of notches positioned on the rigid rim, and the receptacle opening being aligned with the seat opening.

10. The disposable waste collection system for a portable commode as claimed in claim 9, wherein the first side bar and the second side bar are made of a magnetic material and are positioned opposite each other across the seat.

11. The disposable waste collection system for a portable commode as claimed in claim 9, wherein the luminescent sitting surface is laterally positioned around the seat opening, and forms a top surface of the seat.

12. The disposable waste collection system for a portable commode as claimed in claim 9, wherein the seat opening extends through a thickness dimension of the seat between the first side bar and the second side bar.

13. The disposable waste collection system for a portable commode as claimed in claim 9, wherein the seat further comprises a first socket and a second socket being positioned adjacent opposite ends of the first side bar on the underside of the seat and a third socket and a fourth socket positioned adjacent opposed ends of the second side bar on the underside of the seat.

14. The disposable waste collection system for a portable commode as claimed in claim 9 wherein the first leg and the second leg each comprise:
   a) an upper magnetized tube having a set of guide holes linearly positioned along the upper magnetized tube;
   b) a lower tube having a smaller radius than said upper magnetized tube allowing the lower tube to telescope into the upper magnetized tube; and
   c) said lower tube further comprises a base end and a top end; a gripping foot being connected to the base end; a lock hole being positioned adjacent to the top end; a locking mechanism being housed within the lower tube adjacent to the top end; and the locking mechanism being aligned with the lock hole, wherein when the lower tube telescopes into the upper tube and the lock hole is aligned with one of the set of guide holes, the locking mechanism extends through the locking hole and the guide hole thereby preventing the lower tube from moving further into or out of the upper tube.

15. The disposable waste collection system for a portable commode as claimed in claim 14, wherein the locking mechanism is a spring loaded rod.

16. The disposable waste collection system for a portable commode as claimed in claim 9, wherein the rigid rim is situated upon the seat around the seat opening.

17. A disposable waste collection system for a portable commode comprises:
   a modular commode adapted to be affixed to a bed frame or a gurney;
   a disposable, translucent, liquid impervious receptacle, wherein the disposable receptacle includes an absorbent material;
   the modular commode comprises a seat, a first leg, and a second leg;
   the seat comprises a seat opening, a first socket, a second socket, a third socket, a fourth socket, a first side bar, a second side bar, and a sitting surface, wherein the sitting surface is made from a luminescent material;
   the first side bar and the second side bar each comprise a gripping support edge;
   the first leg and the second leg each comprise an upper tube and a lower tube;
   the upper tube comprises a set of longitudinally spaced guide holes;
   the lower tube having a locking mechanism, adapted to cooperate with a selected one of the guide holes for releasably latching the upper tube and lower tube together;
   the disposable translucent receptacle having a receptacle opening, a plurality of measurement markings and a rigid rim, wherein the rigid rim includes a closing mechanism;

the sitting surface being laterally positioned around the seat opening, wherein the sitting surface forms a top surface of the seat;

the seat opening extending through a thickness dimension of the seat between the first side bar and the second side bar;

the first leg and the second leg being perpendicularly attached to the seat;

the upper tube of the first leg adapted to fit into the first socket; and the upper tube of the second leg adapted to fit into the second socket.

18. The disposable waste collection system for a portable commode as claimed in claim 17, wherein:

the first side bar and the second side bar are positioned opposite each other across a width dimension of the seat;

the gripping support edge being angled, wherein the gripping support edge conforms to a gurney or a bed frame;

the first socket and the second socket positioned adjacent to opposed ends of the first side bar on an underside of the sitting surface; and the third socket and the fourth socket positioned adjacent to opposed ends of the second side bar on the underside of the sitting surface.

19. The disposable waste collection system for a portable commode as claimed in claim 17, wherein the lower tube further comprises a base end and a top end with a gripping foot being connected to the base end.

20. The disposable waste collection system for a portable commode as claimed in claim 17, wherein the disposable receptacle is coupled to the seat by the rigid rim and extends through the seat opening with the receptacle opening being delineated by the rigid rim.

21. The disposable waste collection system for a portable commode as claimed in claim 20, wherein the rigid rim is adapted to rest upon the seat around the seat opening.

22. A disposable waste collection system comprising a disposable receptacle made of an absorbent material, said receptacle having an opening, a plurality of measurement markings, and a rigid rim providing a perimeter to the receptacle opening and including a closing mechanism;

a modular commode adapted to attach to a bed frame or a gurney, the modular commode having:

a seat, said seat comprising a luminescent sitting surface, wherein the luminescent sitting surface is made from a phosphorescent material, and an underside, a seat opening creating a space, and a first side bar and a second side bar each having a gripping support edge angled to allow the gripping support edge to conform to one of a bed frame or a gurney side rail;

a first magnetized leg and a second magnetized leg perpendicularly attached to the underside of the seat, wherein the first magnetized leg and second magnetized leg provide underneath support to the seat; and the disposable receptacle being coupled to the seat by the rigid rim, the disposable receptacle extending through the seat opening, the receptacle opening being surrounded by the rigid rim, there being a plurality of notches positioned on the rigid rim, and the receptacle opening being aligned with the seat opening.

23. The disposable waste collection system of claim 22, wherein the first side bar and the second side bar are magnetized and positioned opposite each other across the seat.

24. The disposable waste collection system of claim 22, wherein the sitting surface is luminescent and is laterally positioned around the seat opening, wherein the sitting surface forms a top surface of the seat.

25. The disposable waste collection system of claim 22, wherein the seat opening extends through the seat between the first side bar and the second side bar.

26. The disposable waste collection system of claim 22, wherein the seat further comprises a first socket and a second socket being positioned adjacent opposed ends of the first side bar on the underside and a third socket and a fourth socket being positioned adjacent opposed ends of the second side bar on the underside.

27. The disposable waste collection system of claim 22, wherein the first leg and the second leg each comprise:

a) an upper tube of magnetic material; and b) a lower tube having a smaller radius than said upper tube allowing the lower tube to telescope into the upper tube, one of said upper and lower tubes having a set of guide holes longitudinally spaced thereon and the other of said upper and lower tubes including a detent for cooperating with one of the set of holes such that when the lower tube telescopes into the upper tube, and the detent is aligned with one of the set of guide holes, thereby preventing the lower tube from moving with respect to the upper tube.

28. The disposable waste collection system of claim 27, wherein the lower tube further includes a gripping foot positioned on a bottom end of the lower tube.

29. The disposable waste collection system of claim 27, wherein the detent comprises a spring loaded rod housed within the lower tube adjacent a top end of the lower tube.

30. The disposable waste collection system of claim 27, wherein the upper tube of the first leg is adapted to fit into a first socket of the underside and the upper tube of the second leg is adapted to fit into a second socket on the underside.

31. The disposable waste collection system of claim 22, wherein the absorbent material is sodium polyacrylate.

32. The disposable waste collection system of claim 22, wherein the plurality of measurement markings allows a user to estimate the volume of contents held by the disposable receptacle.

* * * * *